United States Patent [19]

Utsumi et al.

[11] Patent Number: 4,787,521
[45] Date of Patent: Nov. 29, 1988

[54] STIMULABLE PHOSPHOR SHEET STACKING TRAY

[75] Inventors: Isao Utsumi; Yasuhiro Kawai; Kaoru Tamura, all of Kanagawa; Yasunori Maehara, Tochigi; Sigeme Fujiwara, Tochigi; Katsuhide Koyama, Tochigi, all of Japan

[73] Assignees: Fuji Photo Film Co., Ltd.; Kabushiki Kaisha Toshiba, both of Japan

[21] Appl. No.: 5,665

[22] Filed: Jan. 21, 1987

Related U.S. Application Data

[62] Division of Ser. No. 808,174, Dec. 12, 1985.

[30] Foreign Application Priority Data

Dec. 13, 1984 [JP] Japan ................. 59-263500
Dec. 13, 1984 [JP] Japan ................. 59-263501
Dec. 13, 1984 [JP] Japan ................. 59-263502

[51] Int. Cl.$^4$ ................................ A47F 7/00
[52] U.S. Cl. ........................ 211/51; 250/327.2
[58] Field of Search ............ 211/51, 50, 49.1, 1, 211/71, 126, 10, 11; 250/327.2, 207, 220, 221, 224

[56] References Cited

U.S. PATENT DOCUMENTS

| | | | |
|---|---|---|---|
| 1,217,973 | 3/1917 | Mann | 211/10 X |
| 1,512,679 | 10/1924 | Dudley | 271/220 X |
| 1,962,146 | 6/1934 | Hampton | 271/220 X |
| 3,907,128 | 9/1975 | Cathers | 271/224 X |
| 4,354,672 | 10/1982 | Kulpa et al. | 271/221 |

Primary Examiner—Ramon S. Britts
Assistant Examiner—Sarah A. Lechok Eley
Attorney, Agent, or Firm—Gerald J. Ferguson, Jr.

[57] ABSTRACT

A stimulable phosphor sheet stacking tray comprises a tapered section for aligning stimulable phosphor sheets at a predetermined position, which is positioned at least at an inner wall of one side end face of the stacking tray where a lower end portion of the stimulable phosphor sheet falling by the sheet weight passes through. Or, the stacking tray comprises a sheet holding member positioned for contact with upper ends of the stacked stimulable phosphor sheets between an inner wall of an upper end face of the stacking tray and the upper ends of the stacked stimulable phosphor sheets, and a system for moving, by operation from the exterior, the sheet holding member to and away from the stacked stimulable phosphor sheets. Or, the stacking tray is provided with a sheet fall preventing member comprising a stopper projectable from the center of a side end of the opening face of the stacking tray to the inside of the opening face to prevent the sheet falling, and a member for supporting and moving the stopper.

2 Claims, 6 Drawing Sheets

F I G.1
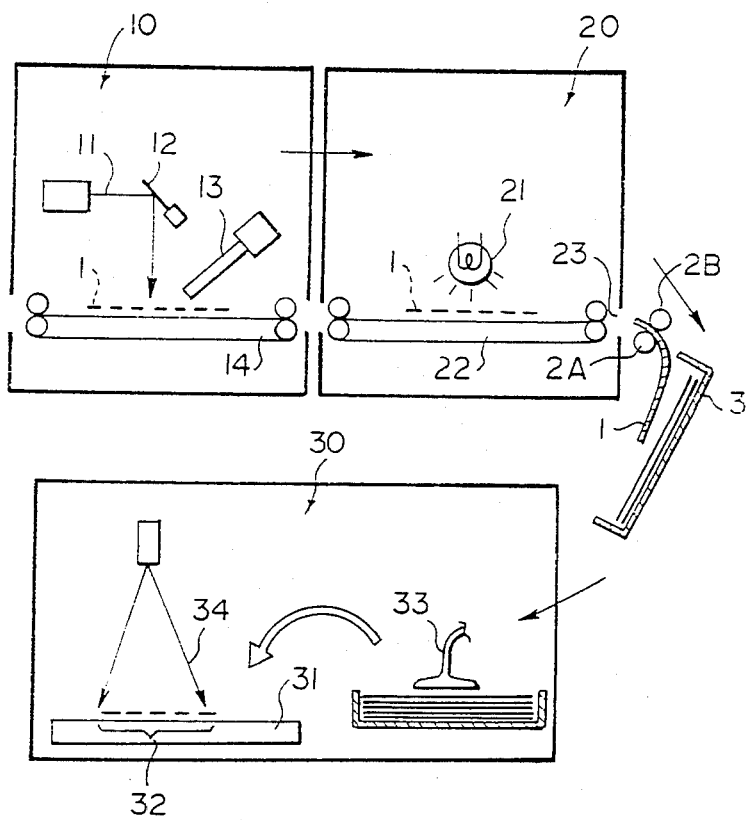

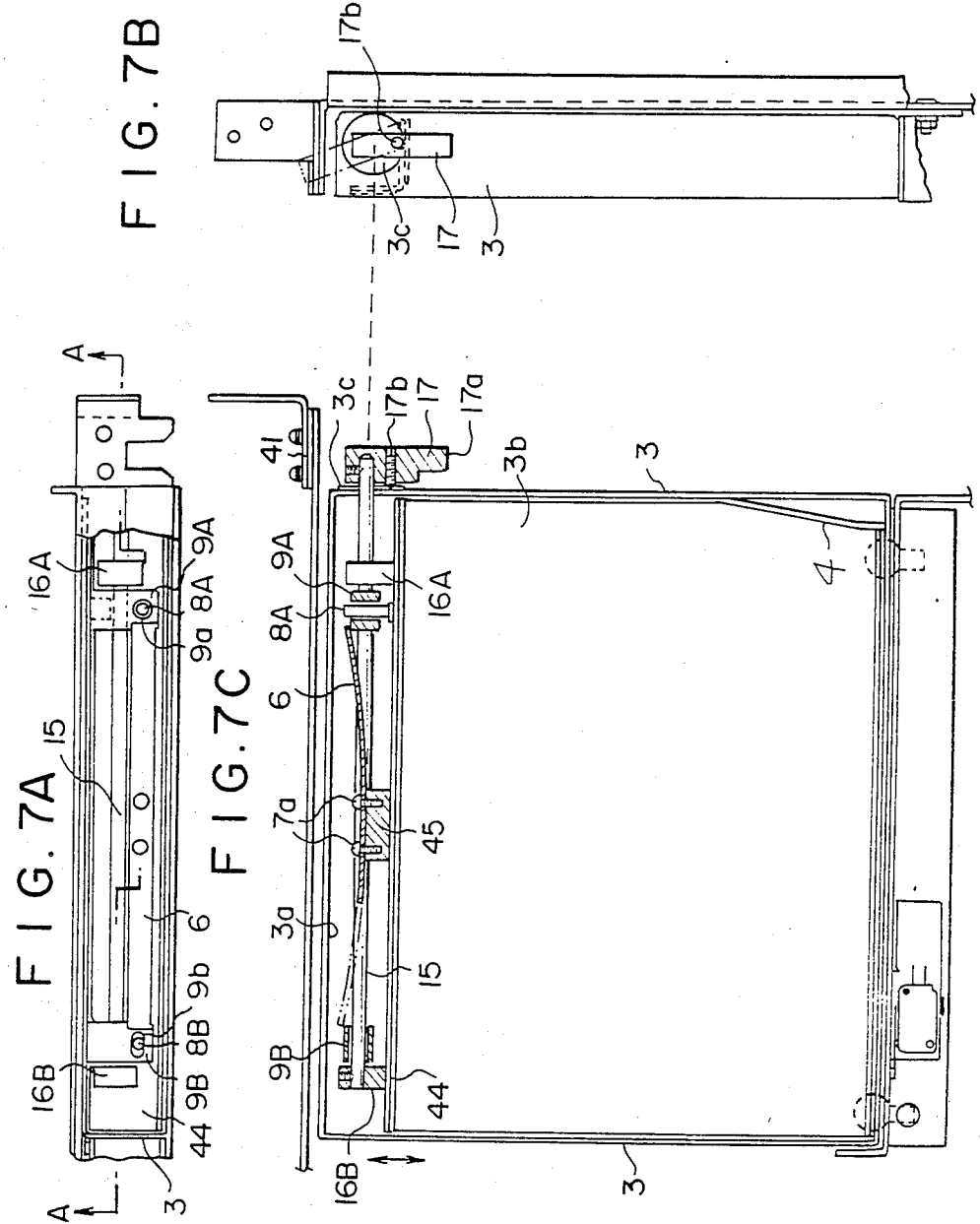

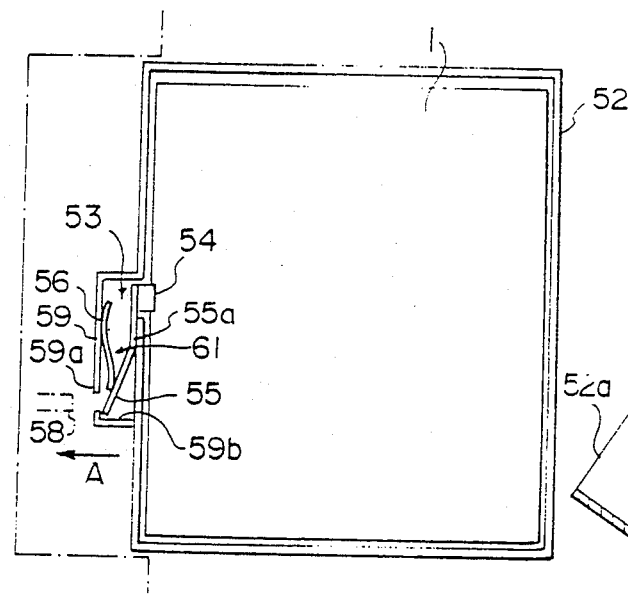
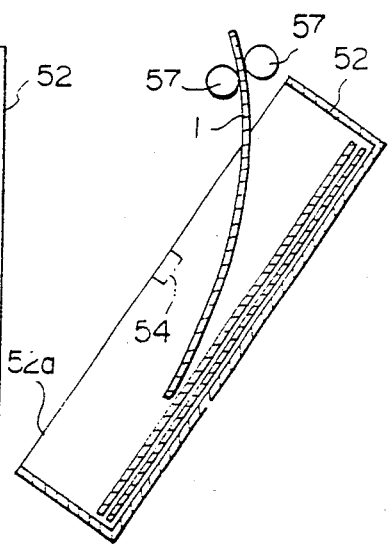
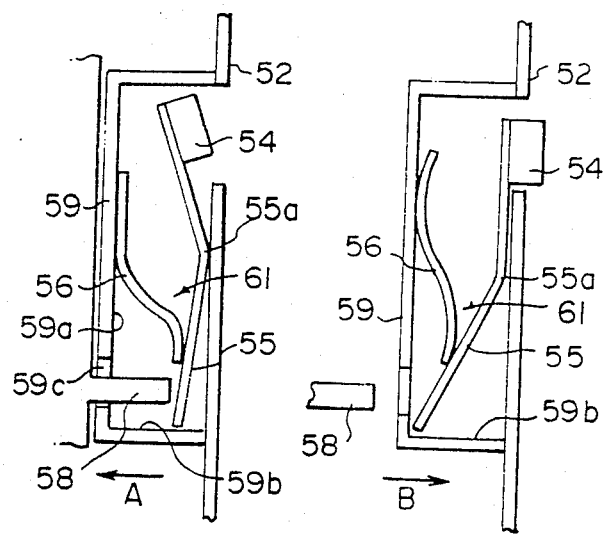
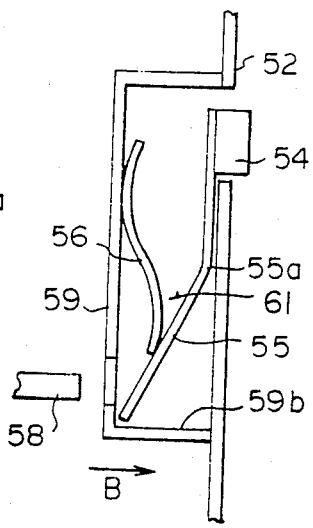
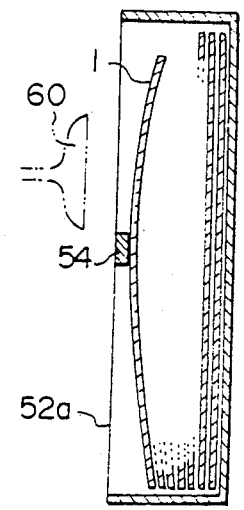

F I G. 13
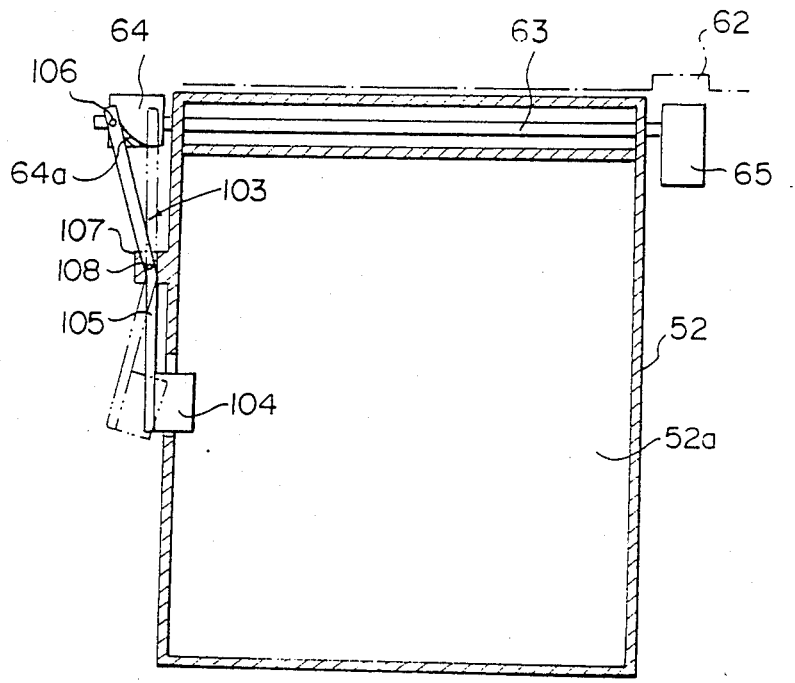
F I G. 14
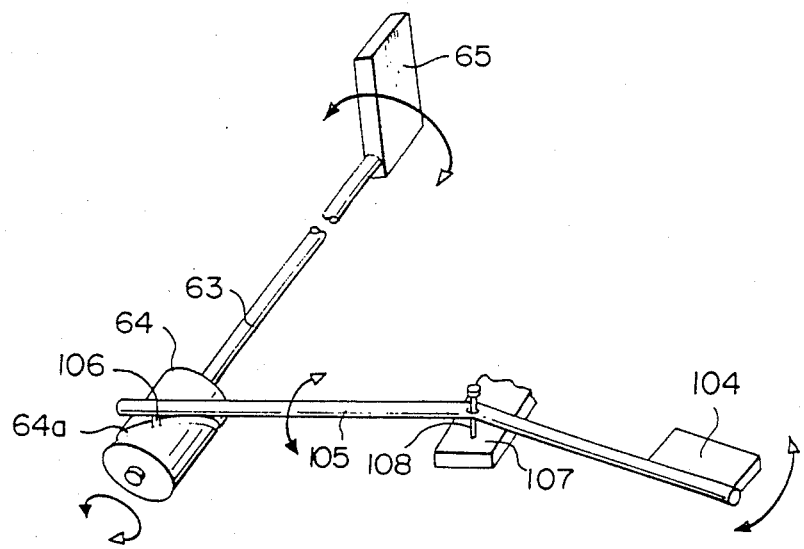

STIMULABLE PHOSPHOR SHEET STACKING TRAY

CROSS-REFERENCE TO RELATED APPLICATIONS

The present application is a divisional application of pending Ser. No. 808,174 filed on Dec. 12, 1985.

BACKGROUND OF THE INVENTION

1. Field of the Invention

This invention relates to a stacking tray for stacking therein stimulable phosphor sheets one by one by sheet feeding with a feed mechanism such as feed rollers and sheet falling by sheet weight. This invention particularly relates to a stacking tray for stacking stimulable phosphor sheets in the aligned form at a predetermined position in the tray.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S/ Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economy, therefore, it is desirable that the stimulable phosphor sheet be used repeatedly.

In order to use the stimulable phosphor sheets repeatedly, after the image read-out by scanning with stimulating rays the stimulable phosphor sheet is subjected to the erasing of radiation energy remaining on the sheet, i.e. residual image erasing. The residual image erasing is conducted, for example, by exposing the whole surface of the stimulable phosphor sheet to light having a wavelength within the stimulation wavelength range of the stimulable phosphor constituting the sheet, or by heating the sheet. After the stimulable phosphor sheet is subjected to residual image erasing, the sheet is reused for image recording. In this process, the erased stimulable phosphor sheets are stacked in a sheet stacking tray and carried in this form to an image recording section. In this case, the stimulable phosphor sheets are stacked one by one in the stacking tray by sheet feeding with a feed mechanism such as feed rollers positioned in the vicinity of the upper section of the stacking tray and sheet falling by sheet weight. In order to guide the stimulable phosphor sheets securely into the stacking tray, the width of the feed mechanism is made larger than the width of the stimulable phosphor sheet, and the width of the stacking tray is made larger than the width of the feed mechanism. Therefore, the stimulable phosphor sheets guided into the stacking tray by the feed mechanism and falling thereinto by sheet weight do not always align at a predetermined position within the stacking tray, and are stacked in a form deviating from each other in the width direction of the sheets. Further, the sheets readily move inside of the stacking tray. As a result, the stimulable phosphor sheets move inside of the stacking tray during conveyance and are damaged. Also, when image recording is conducted on the stimulable phosphor sheet, the stimulable phosphor sheets are taken one by one out of the stacking tray by a member on the side of the image recording apparatus and are conveyed automatically to the image recording position. If the stimulable phosphor sheets do not align at the predetermined position inside of the stacking tray conveyed to the recording section, sheet deviation is caused at the image recording position by the sheet deviation in the stacking tray, and the sheet projects out of a predetermined image recording frame.

SUMMARY OF THE INVENTION

The primary object of the present invention is to provide a stacking tray for stacking stimulable phosphor sheets therein one by one by sheet feeding with a feed mechanism and sheet falling by sheet weight for feeding the stimulable phosphor sheets to the next stage, which has a configuration for aligning the stimulable phosphor sheets at a predetermined position inside of the stacking tray so that stimulable phosphor sheets are not damaged due to sheet movement during conveyance of the stacking tray and are not deviated from a predetermined position at the next stage when the stimulable phosphor sheets are fed to the next stage.

Another object of the present invention is to provide a stacking tray which has a configuration for holding the stimulable phosphor sheets at a predetermined position inside of the stacking tray.

The specific object of the present invention is to provide a stacking tray which has a configuration for preventing the stimulable phosphor sheets from falling when the stacking tray is positioned so that the sheets stacked inside of the stacking tray stand erect, and for allowing easy and secure sheet removal and sheet housing.

The present invention provides a stacking tray for stacking therein stimulable phosphor sheets one by one by sheet feeding with a feed mechanism and sheet falling by sheet weight, the stacking tray comprising: a tapered section for aligning said stimulable phosphor sheets at a predetermined position said tapered section being positioned at least at an inner wall of one side end face of said stacking tray where a lower end portion of said stimulable phosphor sheet falling by the sheet weight passes through.

In the stacking tray of the present invention, the stimulable phosphor sheets are aligned at a predetermined position and prevented from moving inside of the stacking tray by the tapered section positioned at least at the inner wall of one side end face of the stacking tray. The inner width of the stacking tray at the position where the tapered section is provided is made approximately equal to the width of the stimulable phosphor sheet.

In the stacking tray for stimulable sheets in accordance with the present invention, the tapered section is positioned at least at the inner wall of one side end face, it is possible to align the phosphor sheets falling by the sheet weight at a predetermined position and to prevent them from deviating inside of the stacking tray. Therefore, the stimulable phosphor sheets are not damaged due to movement thereof inside of the stacking tray during conveyance of the stacking tray. Also, stacking tray of the present invention eliminates the that the stimulable phosphor sheets are deviated in th tray conveyed to the next stage, and as a result, de from a predetermined position at the next stage sheets are taken one by one out of the stacking tray and to the predetermined position.

Further, when the surface of the tapered section is provided with a slide layer, it is possible to align the stimulable phosphor sheets more smoothly by the tapered section. When the slide layer is positioned on the surface of the tapered section via a cushioning material, it becomes possible to attain a sliding effect and a cushioning effect.

The stacking tray of the present invention is highly effective without the use a complicated mechanism. This is very advantageous in practice The present invention also provides a stacking tray for stacking therein stimulable phosphor sheets one by one by sheet feeding with a feed mechanism and sheet falling by sheet weight, the stacking tray comprising: a sheet holding member positioned for contact with upper ends of the stacked stimulable phosphor sheets between an inner wall of an upper end face of said stacking tray and the upper ends of the stacked stimulable phosphor sheets, and a means for moving, by operation from the exterior, said sheet holding member between a position at which said sheet holding member contacts the upper ends of said stacked stimulable phosphor sheets and a position spaced from said stacked stimulable phosphor sheets.

In the stacking tray of the present invention, the sheet holding member should have a size sufficient to prevent the stacked stimulable phosphor sheets from moving inside of the stacking tray. The means for moving the sheet holding member should be adjusted for making the sheet holding member contact the stacked stimulable phosphor sheets sufficiently strongly to restrict movement of the sheets without bending or damaging the sheets when movement of the stacked sheets is to be restricted.

In the stacking tray of the present invention, since the sheet holding member for restricting movement of the stimulable phosphor sheets from the predetermined stacking position during conveyance of the stacking tray and the means for moving the sheet holding member between the position at which the sheet holding member contacts the stimulable phosphor sheets and the position spaced from the sheets are positioned above the sheets stacked in the stacking tray, the stacked sheets do not deviate from the predetermined stacking position due to movement inside of the stacking tray. Therefore, the sheets are not damaged due to rubbing against each other and are not deviated from a predetermined position at the next stage when they are fed to the next stage. Thus it is possible to shift the sheets securely from one apparatus to another.

The present invention further provides a stacking tray for stacking therein stimulable phosphor sheets one by one in parallel with an inner wall surface facing an opening face of the stacking tray, the stacking tray comprising: a sheet fall preventing member comprising (i) a stopper allowing removal of said stimulable phosphor sheets by an external member and projectable from the center of a side end of said opening face of said stacking tray to the inside of said opening face of said stacking tray to prevent said stimulable phosphor sheets from falling outwardly of said opening face when said stacking tray is at such a position that said stimulable phosphor sheets inside of said stacking tray stand erect, and (ii) a supporting means for supporting said stopper and moving said stopper inwardly and outwardly of said opening face by an external operation.

The stopper is of a size such as to prevent the stimulable phosphor sheets inside of the stacking tray from falling and for allowing the sheets stacked inside of the stacking tray to be taken out one by one by an external member. The supporting means supports the stopper so that the stopper is moved to the inside and outside of the opening face of the stacking tray by an external operation. The supporting means may, for example, be of the type supporting the stopper so that the stopper is urged inwardly of the opening face by spring force and is retracted outwardly of the opening face by an external operation. Or, the supporting means may be of the type supporting the stopper by a member engaged with a groove cam and moving the stopper inwardly and outwardly of the opening face by rotating the groove cam by an external operation and moving the member.

In the stacking tray of the present invention, also, since the sheet fall preventing member comprising the stopper projectable inwardly of the opening face of the stacking tray is provided, the stimulable phosphor sheets do not fall outwardly of the opening face when the stacking tray is positioned so that the stimulable phosphor sheets stacked inside of the stacking tray stand erect. Further, since the stopper is retractable from the opening face of the stacking tray, it is possible to retract the stopper from the opening face when necessary, for example, when stacking the stimulable phosphor sheets. When the stopper movement is conducted in synchronization with loading or locking of the stacking tray to a stacking apparatus, it is possible to obtain a major effect by a simple mechanism

BRIEF DESCRIPTION OF THE DRAWINGS

FIG. 1 is a schematic view showing an example of an embodiment of the stimulable phosphor sheet stacking tray in accordance with the present invention, FIG. 7A is a plan view showing the embodiment of the stacking tray in accordance with the present invention, which is positioned inside of the sorter section shown in FIG. 6, FIG. 7B is a side view of FIG. 7A, FIG. 7 sectional view taken along line A—A of FIG. 7A, FIG. 9 is a plan view showing the configuration of a further embodiment of the stimulable phosphor sheet stacking tray in accordance with the present invention, FIG. 10 is a sectional view showing the sheets stacked in the stacking tray of FIG. 9, FIGS. 11A and 11B are enlarged views showing the sheet fall preventing member during engagement and disengagement of the stacking tray of FIG. 9 on a stacking apparatus, FIG. 12 is a sectional view showing the function of the sheet fall preventing member, FIG. 13 is a plan view showing the configuration of another embodiment of the stacking tray in accordance with the present invention, and FIG. 14 is a perspective view showing the sheet fall preventing member of the stacking tray shown in FIG. 13 and the configuration of the mechanism for driving the sheet fall preventing member.

DESCRIPTION OF THE PREFERRED EMBODIMENT

Figure 2:
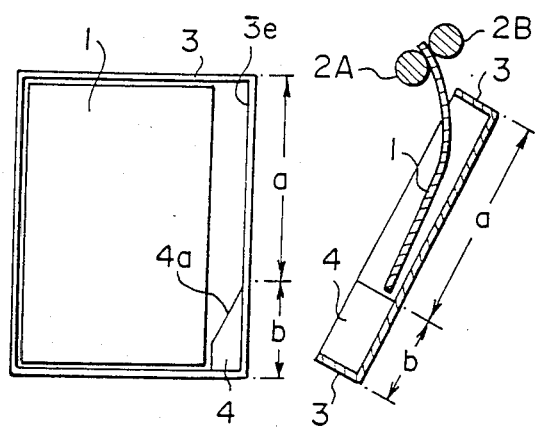
FIG. 2 is a plan view and a sectional view showing an embodiment of the stacking tray in accordance with the present invention.

The present invention will hereinbelow be described in further detail with reference to the accompanying drawings With reference to FIG. 1, at a radiation image readout section 10, a stimulable phosphor sheet (hereinafter referred to as the sheet) 1 carrying a radiation image stored therein is scanned with stimulating rays 11 such as a laser beam deflected by a light deflector 12, and the radiation image is detected by an image read-out system 13 for photoelectrically detecting light emitted by the sheet 1 in proportion to the stored radiation energy during the scanning while the sheet 1 is conveyed by a conveyor belt 14. After the image read-out is finished the sheet 1 is conveyed to a residual image erasing section 20. At the residual image erasing section 20, the sheet 1 is exposed to erasing light emitted by an erasing light source 21 positioned above the sheet 1 while the sheet 1 is conveyed by a conveyor belt 22, and radiation energy remaining on the sheet 1 is erased. The erasing light source 21 causes the sheet 1 to release the residual radiation energy by emitting light having a wavelength within the stimulation wavelength range of the stimulable phosphor of the sheet 1, and may be a fluorescent lamp, a tungsten-filament lamp, a halogen lamp, an infrared lamp, a laser beam source, or the like.

After radiation energy remaining on the sheet 1 is erased at the residual image erasing section 20, the sheet 1 is carried out of the residual image erasing section 20 into a sheet stacking tray 3. A pair of feed rollers 2A and 2B for guiding the sheet carried out of the residual image erasing section 20 into the tray 3 are positioned outside of the residual image erasing section 20 in the vicinity of a sheet outlet 23 of the residual image erasing section 20. The sheet 1 is guided by the feed rollers 2A and 2B into the tray 3 positioned obliquely with an opening face thereof facing up. After the sheet 1 separates from the feed rollers 2A and 2B, the sheet 1 falls under its own weight into the tray 3. In this manner, the sheets 1 are stacked up in the tray 3 one by one. Though a single tray 3 is positioned in FIG. 1, a plurality of trays may be positioned so that they are selected for stacking of the sheets 1 therein in accordance with the sheet size.

Figure 3:
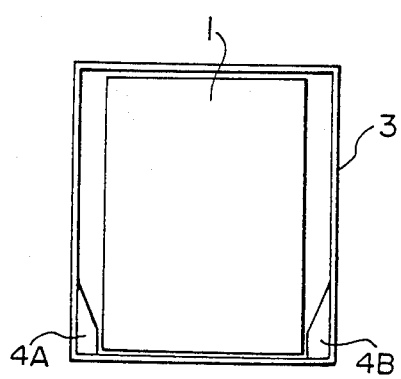
FIGS. 3 and 4 are plan views showing further embodiments of the stacking tray in accordance with the present invention.
Figure 4:
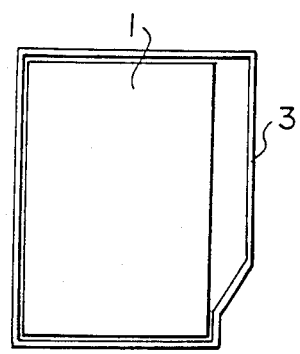
Figure 5:
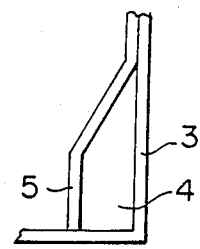
FIG. 5 is an enlarged view showing an embodiment of the stacking tray in accordance with the present invention, which has a tapered section provided on the surface with a slide layer.

The feed rollers 2A and 2B have a width larger than the width of the sheet 1 to guide the sheet 1 securely. The tray 3 has a width larger than the widths of the feed rollers 2A and 2B in order to securely receive the sheet 1 guided by the feed rollers 2A and 2B. Thus, as shown in FIG. 2, the width of the tray 3 is larger than the width of the sheet 1. A tapered section 4 is provided on an inner wall 3e of one side end face of the tray 3 at the position indicated by b in FIG. 2. The sheet 1 sent to the tray 3 in a slightly deviated condition is guided to a predetermined position by the tapered section 4. The part of the tapered section 4 marked b denotes the section which the lower end of the sheet 1 introduced by the feed rollers 2A and 2B into the tray 3 by the extent indicated by a passes into as the sheet 1 falls under its own weight after separating from the feed rollers 2A and 2B. As the sheet 1 falls, the lower end thereof slides on a tapered surface 4a of the tapered section 4 and is guided to the predetermined position. The tapered section 4 is fabricated of a material allowing the sheet 1 contacting the tapered section 4 to slide and fall by the sheet weight, for example, a synthetic resin or a metal. In the embodiment of FIG. 2, the lower portion of the tapered section 4 is formed as a straight portion parallel to the other side end face of the tray 3. The portion does not need to be formed. Thus, but, by forming the lower portion of the tapered section 4 straight as described above, it is possible to adjust the position of the sheet 1 more securely inside of the tray 3. As shown in FIG. 3, tapered sections 4A and 4B may be positioned respectively on the inner walls of the two side end faces of the tray 3. Also, as shown in FIG. 4, the side end face of the tray 3 may be formed in a tapered shape. Further, as shown in FIG. 5, a slide layer 5 such as a Teflon layer or a polyethylene layer may be overlaid at least on the surface of the tapered section 4. In this case, it is possible to guide the sheet 1 more smoothly by the tapered section 4. The slide layer 5 should preferably be constituted by a cushioning material such as a material comprising a sponge layer and a polyethylene film secured to the surface of the sponge layer, or a pile material since this makes it possible to reduce the impact of the falling sheet, preventing the sheet 1 from being damaged at its edges or the like, and providing both a cushioning effect and a sliding effect.

The sheets 1 stacked in the aligned condition in the tray 3 are conveyed to a recording section 30 shown in FIG. 1 for recording a radiation image. At the recording section 30, the sheets 1 are sucked up one by one by a suction, arm 33, taken out of the tray 3, and automatically conveyed to an image recording table 31. Since the sheets 1 are aligned in the tray 3 without deviating from the predetermined position, each of the sheets 1 is correctly placed by the suction arm 33 at a predetermined image recording position 32 within the irradiation field of a radiation 34.

Figure 6:
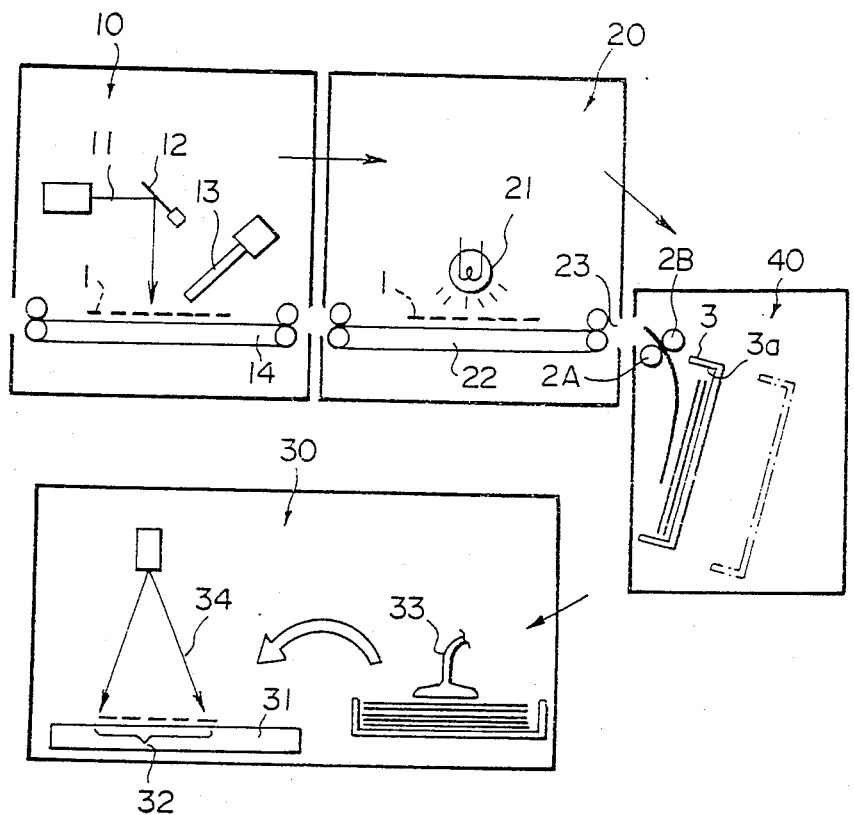
FIG. 6 is a schematic view showing an example of another embodiment of the stimulable phosphor sheet stacking tray in accordance with the present invention.

FIG. 6 shows an example of another embodiment of the stimulable phosphor sheetstacking tray in accordance with the present invention. In FIG. 6, similar elements are numbered with the same reference numerals with respect to FIG. 1. The example shown in FIG. 6 is similar to the example of FIG. 1, except that one or more trays are positioned inside of a sorter section 40 so that one of the trays is selected for sheet stacking in accordance with the sheet size, and a space remains between the upper ends of the stacked sheets and an inner wall surface 3a at the upper end of the tray 3.

The configuration and sheet holding mechanism of a further embodiment of the stacking tray in accordance with the present invention will hereinbelow be described with reference to FIGS. 7A, 7B and 7C.

A sheet holding member 44 comprising two layers and having a width approximately equal to the width of the sheets 1 stacked in the tray 3 is positioned between the upper ends of the sheets 1 stacked in the tray 3 and the inner wall surface 3a at the upper end of the t-ay 3. A bracket 45 is secured to the center of the upper surface of the sheet holding member 44 in the vicinity of the opening face of the tray 3. A leaf spring 6 is secured by screws 7a, 7a to the upper surface of the bracket 45. A air of guide pins 8A and 8B are respectively embedded normal to the sheet holding member 44 near the right and left ends of the upper surface of the sheet holding member 44. A pair of bearings 9A and 9B are secured normal to a bottom plate 3b of the tray 3 which is parallel to the surfaces of the sheets 1 stacked in the tray 3. The bearings 9A and 9B respectively have through holes 9a and 9b at positions corresponding to the guide pins 8A and 8B. The guide pins 8A and 8B are moveable vertically inside of the through holes 9a and 9b. The ends of the leaf spring 6 are slidably mounted on the bearings 9A and 9B. As the guide pins 8A and 8B move vertically inside of the through holes 9a and 9b, the sheet holding member 44 is moved between a position at which the member 44 restricts movement of the stacked sheets in the aligned condition and a position at which the member 44 is retracted upwardly and releases the sheet movement restriction. The sheet holding member 44 is moved by a sheet holding member moving means which comprises a rotation shaft 15 extending in the width direction of the tray 3 on the side of the bottom plate 3b of the tray 3 with respect to the leaf spring 6 above the sheet holding member 44 and having one end projected outwardly of a side end face of the tray 3, a pair of eccentric cams 16A and 16B positioned integrally with the rotation shaft 15 so as to contact the sheet holding member 44 . near the ends thereof, and a tray locking and sheet holding member drive lever (hereinafter referred to as the lever) 17 which is formed integrally with the end of the rotation shaft 15 projecting outwardly of the side end face of the tray 3. When the tray 3 is loaded and locked to the sorter section 40, an engagement protrusion 17a of the lever 17 is rotated approximately a half turn from the position shown in FIG. 7C to the position indicated by the chain line in FIG. 7B and engaged with a lock lever receiver 41 on the sorter side, and the tray 3 is locked to the sorter section 40. As the engagement protrusion 17a is rotated upwardly, smaller diameter sides of the eccentric cams 16A and 16B rotated by the rotation shaft 15 contact the sheet holding member 44. Therefore, the leaf spring 6 which has been bent as shown in FIG. 7C returns to the straight form, and the sheet holding member 44 retracts up, so that stacking of the sheets 1 in the tray 3 becomes possible When sheet stacking is finished and the tray 3 is conveyed out of the sorter section 40, the engagement protrusion 17a of the lever 17 is disengaged from the lock lever receiver 41 and rotated downwardly. As a result, larger diameter sides of the eccentric cams 16A and 16B come into contact with the sheet holding member 44. Therefore, the sheet holding member 44 is pushed down by the eccentric cams 16A and 16B until it contacts the upper ends of the stacked sheets 1, and the leaf spring 6 is bent as the sheet holding member 44 is moved down. Thus by contacting the sheet holding member 44, the stacked sheets 1 are aligned without deviating vertically. In order to fix the lever 17 at the position for locking the tray 3 to the sorter and at the position for releasing the lock, the lever 17 is provided with a click pin 17b which engages at a predetermined position with a click stop plate on the end face of the lever 17 side of the tray 3, thereby fixing the lever 17. Further, a tapered section 4 is positioned at a lower portion of the inner wall surface of the lever 17 side end of the tray 3. The tapered section acts in the same manner as the tapered section 4 described with reference to FIG. 2. Though the tapered section 4 is not essential, it is preferable when deviation of the stacked sheets 1 in the width direction thereof presents a problem at the time of feeding sheets to the next stage. The tapered section 4 may be formed on either side or on both sides inside of the tray 3.

Figure 8:
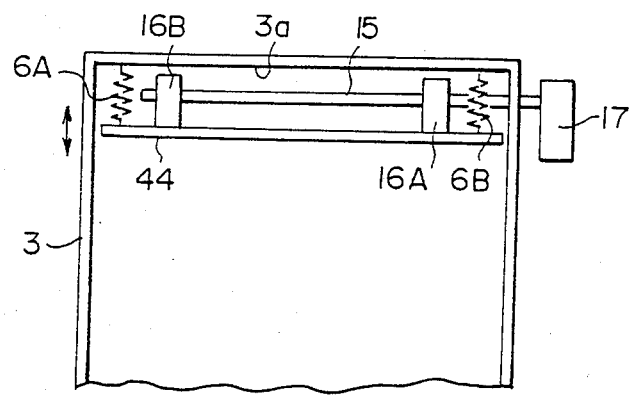
FIG. 8 is a schematic view showing a major part of another embodiment of the stacking tray in accordance with the present invention.

The tray 3 is not limited to the configuration shown in FIGS. 7A, 7B and 7C, and various members may be used insofar as there are provided the sheet holding member and a means for moving the sheet holding member between the position at which the sheet holding member contacts the sheets and the position retracted from the contact position For example, as shown in FIG. 8, instead of the leaf spring, coiled springs 6A and 6B may be secured at both ends to the sheet holding member 44 and the inner wall surface 3a at the upper end of the tray 3, and the eccentric cams 16A and 16B of the sheet holding member moving means similar to that described above may contact the sheet holding member 44 to extend or contract the coiled springs 6A and 6B, thereby moving the sheet holding member 44. Further, the lever 17 need not necessarily act also as a lock lever for preventing the tray 3 from disengaging from the sorter section 40. A different lever may be used for locking the tray 3.

It should be noted that the stimulable phosphor sheet stacking tray in accordance with the present invention is also applicable to the cases other than where stimulable phosphor sheets ejected from the residual image erasing section are stacked for feeding to the image recording section.

FIG. 9 is a plan view showing the configuration of a further embodiment of the stimulable phosphor sheet stacking tray in accordance with the present invention.

In FIG. 9, a sheet fall preventing member 53 comprising a stopper 54 constituted by a plastic material and a pile material secured to the surface of the plastic material, and a supporting means 61 is positioned at the center of one side end face of a tray 52. The supporting means 61 comprises a supporting plate 55 of a bent shape having one end secured to the stopper 54 and a bent edge portion 55a contacted with one side end face of the tray 52, and a leaf spring 56 having one end secured to the surface of stopper 54 in the vicinity of the other end of the supporting plate 55. The leaf spring 56 urges the stopper 54 inwardly of an opening face 52a of the tray 52 shown in FIG. 10. The sheet fall preventing member 53 prevents the sheets 1 from falling outwardly of the opening face 52a by the stopper 54 projecting inwardly of the opening face 52a and contacting one of the sheets 1 when the tray 52 is positioned so that the sheets 1 stand erect. The sheet fall preventing member 53 is positioned within a housing case 59 formed integrally with the side wall of the tray 52. The leaf spring 56 slidably contacts an inner wall surface 59a of the case 59 facing the tray 52, and the other end of the supporting plate 55 opposite to the end provided with the stopper 54 slidably contacts an inner wall surface 59b at the lower end of the case 59.

As shown in FIG. 10, when the sheets 1 are stacked in the tray 52, the sheets 1 are introduced one by one by feed rollers 57, 57 positioned above the tray 52 near the opening face 52a into the tray 52 loaded obliquely or horizontally with the opening face 52a facing up in a sheet stacking apparatus. When the stopper 54 is projected inwardly of the opening face 52a at the time of sheet stacking, it obstructs the sheet stacking. Therefore, as shown in FIG. 9, when the tray 52 is loaded in the direction as indicated by the arrow A into the stacking apparatus, a push rod 58 positioned on the stacking apparatus side pushes the supporting plate 55 of the sheet fall preventing member 53 to retract the stopper 54 from the opening face 52a. The function of the push rod 58 will further be described with reference to FIGS. 11A and 11B.

FIG. 11A is an enlarged view showing the condition of the sheet fall preventing member 53 when the tray 52 is loaded into the stacking apparatus.

When the tray 52 is loaded in the direction as indicated by the arrow A into the stacking apparatus, the push rod 58 enters the case 59 from a hole portion 59c thereof and pushes a portion of the supporting plate 55 below the point secured to the leaf spring 56. When pushed by the push rod 58, the supporting plate 55 slides along the inner wall surface 59b at the lower end of the case 59 while bending the leaf spring 56 towards the side end face of the tray 52. Also, the stopper 54 secured to one end of the supporting plate 55 moves inwardly of the case 59 and retracts from the opening face 52a of the tray 52. On the other hand, as shown in FIG. 11B, when the tray 52 is pulled outwardly of the stacking apparatus in the direction as indicated by the arrow B, the supporting plate 55 is released from the push rod 58. Therefore, the unbending force of the leaf spring 56 which has been bent forcibly serves to slide the supporting plate 55 away from the side end face of the tray 52 along the inner wall surface 59b at the lower end of the case 59 and back to its original position As a result, the stopper 54 projects to the position at which it holds the sheets 1 inside of the opening face 52a of the tray 52. With the sheet fall preventing member 53 in this state, the tray 52 is conveyed to a different section such as the image recording section. Accordingly, as shown in FIG. 12, the sheets 1 are prevented by the stopper 54 from falling outwardly of the opening face 52a when the tray 52 is rotated or positioned so that the sheets 1 stand erect. Also, since the sheets 1 are flexible, when the sheet 1 is sucked by a suction disc 60 and taken out of the tray 52 at the image recording section or the like, the sheet 1 is taken out in the bent form in contact with the stopper 54. Therefore, the stopper 54 does not obstruct the sheet removal. In this embodiment, since the stopper 54 is urged by spring force, and retracts outwardly of the opening face 52a when the sheet 1 contacts the stopper 54 at the time of sheet removal, the sheets 1 can be readily taken out of the tray 52. Sheet removal may further be facilitated when the surface of the stopper 54 contacting the sheets 1 is tapered in the direction of sheet removal. Also, when the sheet 1 is sucked up by the suction disc 60 and taken out of the tray 52, since the sheet 1 is bent in contact with the stopper 54, the first sheet 1 securely separates from the second sheet 1 even though the sheets 1 are stacked in close contacting each other. Thus the stopper 54 also has the effect of eliminating the problem that two or more sheets are taken out simultaneously.

The means for retracting the stopper 54 is not limited to the push rod 58 and may be a different member operated externally. Also, the sheet fall preventing member 53 may be positioned on both sides of the tray 52.

FIGS. 13 and 14 show another embodiment of the stimulable phosphor sheet stacking tray in accordance with the present invention, in which the stopper 54 is moved inwardly and outwardly without using the urging force of the spring.

In this embodiment, a lock lever 65 is positioned outside of an upper portion of one side end face of the tray 52. When the tray 52 is loaded into the stacking apparatus, the lock lever 65 is rotated and engaged with a lock lever receiving section 62 on the stacking apparatus side to fix the tray 52 to the stacking apparatus. A supporting shaft 63 of the lock lever 65 extends inside of the tray 52 at the upper section thereof and projects outwardly of the other side end face of the tray 52. A groove cam 64 is formed integrally with the projected end portion of the supporting shaft 63. On the other hand, a sheet fall preventing member 103 comprises a supporting rod 105, a protrusion 106 positioned at one end of the supporting rod 105 for engagement with a groove 64a of the groove cam 64, and a stopper 104 secured to the other end of the supporting rod 105. The center of the supporting rod 105 is supported by a pin 108 on a base plate 107 secured to the side wall surface of the tray 52 so that the supporting rod 105 is moveable about the pin 108.

Since the protrusion 106 of the supporting rod 105 is engaged with the groove 64a of the groove cam 64, the two ends of the supporting rod 105 move along a circumference around the pin 108 as the groove cam 64 rotates. The groove 64a of the groove cam 64 is formed to move the supporting rod 105 so that the stopper 104 retracts from the opening face 52a when the lock lever 65 is rotated to the position for engagement with the lock lever receiving section 62 at the time of loading of the tray 52 into the stacking apparatus, and the stopper 104 projects inwardly of the opening face 52a when the lock lever 65 is rotated so that it disengages from the lock lever receiving section 62. Therefore, when the tray 52 is loaded and locked to the stacking apparatus, the stopper 104 retracts outwardly of the opening face 52a in synchronization with the locking operation, and sheet stacking becomes possible. When the lock of the tray 52 is released, the stopper 104 is projected inwardly of the opening face 52a to prevent sheet falling. The stopper 104 is of a size which allows sheet removal by the sheet's flexibility when the sheets 1 are taken out one by one by the suction disc at the image recording section or the like. Though the groove cam 14 is interlocked with the operation of the lock lever 65, it may be operated by a member different from the lock lever 65. Also, the configuration of the stacking tray may be modified in any manner insofar as sheet falling is prevented by a stopper moveable to the positions inside and outside of the opening face of the tray when the sheets are erect.

We claim:

1. A stacking tray for stacking therein stimulable phosphor sheets one by one by sheet feeding with a feed mechanism and sheet falling by sheet weight, comprising:

a tray member having an upper end face, said upper end face having an inner wall;

a sheet holding member positioned for contact with upper edges of the stacked stimulable phosphor sheets, said sheet holding member being disposed between said inner wall of said upper end face of said tray member and the upper edges of the stacked stimulable phosphor sheets, and a means for moving, by operation from the exterior, said sheet holding member between a position at which said sheet holding member contacts the upper edges of said stacked stimulable phosphor sheets and a position spaced from said stacked stimulable phosphor sheets;

said means for moving said sheet holding member including a rotation shaft having one end projected outwardly of said tray member, eccentric cams being formed integrally with said rotation shaft, and a lever secured to said projected end of said rotation shaft.

2. A stacking tray as defined in claim 1 wherein said tray member is adapted to receive therein the stimulable phosphor sheets after radiation energy remaining thereon is erased for recording of a radiation image.

* * * * *